United States Patent
Becenas Nieto

(10) Patent No.: US 6,299,229 B1
(45) Date of Patent: Oct. 9, 2001

(54) MOBILE MORGUE

(75) Inventor: Moises Becenas Nieto, Valladolid (ES)

(73) Assignee: Interpyramid, S.A., Valladolid (ES)

( * ) Notice: Subject to any disclaimer, the term of this patent is extended or adjusted under 35 U.S.C. 154(b) by 0 days.

(21) Appl. No.: 09/446,665

(22) PCT Filed: Apr. 9, 1999

(86) PCT No.: PCT/ES99/00092

§ 371 Date: Apr. 26, 2000

§ 102(e) Date: Apr. 26, 2000

(87) PCT Pub. No.: WO99/55279

PCT Pub. Date: Nov. 4, 1999

(30) Foreign Application Priority Data

Apr. 24, 1998 (ES) .............................................. P 9800880

(51) Int. Cl.⁷ .................................................... B60P 3/05
(52) U.S. Cl. .................. 296/24.1; 296/24 R; 296/26; 296/26.13
(58) Field of Search ................................ 296/24.1, 26.03, 296/26.13, 165, 171, 172, 175, 176

(56) References Cited

U.S. PATENT DOCUMENTS

| 3,694,023 | * | 9/1972 | Burgess ............................... 296/24 R |
| 4,712,822 | * | 12/1987 | Janos et al. ......................... 296/24 R |
| 4,915,435 | * | 4/1990 | Levine ................................ 296/24.1 |
| 4,955,661 | * | 9/1990 | Mattice ................................... 296/26 |
| 5,197,774 | * | 3/1993 | Diaz .................................... 296/24.1 |
| 5,758,918 | * | 6/1998 | Schneider et al. ...................... 296/26 |
| 5,833,296 | * | 11/1998 | Schneider ............................ 296/26.13 |
| 5,902,001 | * | 5/1999 | Schneider ............................ 296/26.13 |
| 5,983,576 | * | 11/1999 | Hanser et al. ......................... 296/171 |
| 5,992,920 | * | 11/1999 | Bailey et al. ......................... 296/172 |
| 6,067,756 | * | 5/2000 | Frerichs et al. .................... 296/26.13 |
| 6,082,799 | * | 7/2000 | Marek ................................. 296/24.1 |

FOREIGN PATENT DOCUMENTS 6 99771 * 12/1994 (JP) .

* cited by examiner

Primary Examiner—Joseph D. Pape
Assistant Examiner—Kiran B. Patel
(74) Attorney, Agent, or Firm—Crowell & Moring LLP

(57) ABSTRACT

A mobile mortuary in which a semi-trailer has extendable large side walls. The inside of the semi-trailer which constitutes a mobile unit is divided into three compartments, one a cooled end cabin, independent of the other two, with a side access door, for emplacement of the casket, which is visible through an inside end window, and the other two compartments define the zone in which the body has extendable facing side walls. One of these compartments, which is at the end, can be accessed via the rear end of the unit by a staircase and a ramp, both of which can be folded up into the structure or chassis. Motors are installed in the semi-trailer chassis structure to drive a rack and pinion mechanism. Each rack is mounted on the moving part of the side wall, and the side walls are guided in their displacement by upper and lower guides with rollers which move along facing guides in the stationary portion of the body.

4 Claims, 4 Drawing Sheets

MOBILE MORGUE

BACKGROUND OF THE INVENTION

This application claims the priority of PCT/ES99/00092, filed Apr. 9, 1999 and P 9800880, filed Apr. 24, 1998, the disclosure of which is expressly incorporated by reference herein.

The present invention is directed to a mobile mortuary. Mobile mortuaries are neither known or in use at the present. The nonexistence of mobile mortuaries creates a major obstacle for inhabitants of small communities in providing the necessary service to a deceased person.

SUMMARY OF THE INVENTION

The mobile mortuary in accordance with the present invention is of simple construction and also enormously functional when the time comes to provide an extensive and complete service to the deceased and his/her family and friends. Furthermore, its functionality makes it possible to move the aforesaid mortuary quickly to the home or temporary resting place of the deceased.

In accordance with the invention, the mobile mortuary includes a dual-axle semi-trailer chassis upon which a body structure with a system for outward expansion of the walls is installed to create sufficient space to accommodate the services offered by this type of funeral facility.

These services will be distributed through three well defined zones: an end cabin reserved for the deceased, another which forms a parlor for the immediate family, and a third, larger cabin for other family and friends. This last parlor will also accommodate a restroom and beverage service area.

As a unit, then, the mobile mortuary consists of a body structure, a refrigerated room for the deceased, a parlor for the immediate family and another parlor designated as the common room.

With regard to the structure, it should be pointed out that the upper front portion of the body contains the cooling unit. This unit has two functions: it maintains the temperature in the deceased's room at a constant temperature of under 5° Centigrade, and, when necessary, acts as an air conditioning system in the other rooms. It will be powered by an electric motor to eliminate the noise which some other type of motor would produce. It will also be equipped with the corresponding control panel which can be operated from outside the vehicle.

As a space expansion option, the rear portion of the semi-trailer may be equipped with a removable trailer, formed by a canvas-covered metallic framework. Installed underneath the chassis will be an electrical heating system which will heat the rooms through the floor of the bodywork an electric power transformer system and a set of electric motors which will activate a rack and pinion power train, for moving the trailer's retractable compartments in and out.

The aforesaid compartments will permit expansion of the available inside space up to a total width of four and one-half meters. Retractable stanchions located under the rear end of the trailer will impart greater stability to the mobile unit, when the compartments are expanded outward. The remainder of the available space beneath the chassis will be occupied by a complex of compartments, which can be used to store the mobile elements of interior furniture, as well as the various devices required by the funeral personnel for their services.

The roof of the chassis body will contain three skylights, with the capability of sliding a louver arrangement beneath them. These skylights will provide natural illumination of the interior, if required, as well as ventilators for replenishing the air in the rooms and freshening or service of the common room. The cooled room will serve as a resting place for the deceased. Its dimensions will permit arrangement in any position. This room will be accessed from the outside, by way of a hermetically sealed door. The aforementioned cooling system will prevent the inside temperature from ever rising above 5° Centigrade.

The coffin will be brought in and out by a folding interior elevator platform. A curtain will screen the platform from view through the window of the immediate family room. This window will be hermetically sealed, with a 15 millimeter space between its panes, to prevent the temperature differential between the rooms from steaming it up. Also, an opaque venetian blind in this window will permit undertaker staff to work with the casket without being seen from inside. A system will also be installed to hang four wreaths in the frontal portion of the chamber. Chapel-type light can be provided.

The room for the immediate family is located in the space to the immediate rear of the aforesaid cooled room, and is separated from the other room by a rigid wall which will be extended automatically by an accordion-pleated screen of fabric panels, when the semi-trailer is extended. It will also have two large windows with suitable venetian blinds.

The interior will be generously furnished for comfortable accommodation of the mourners. The lighting will employ incandescent or fluorescent fixtures, according to preference. Several loudspeakers concealed overhead will permit the creation of a suitable musical background, if desired. The common room features a door which opens to the immediate family room. The common room features a restroom with toilet and wash basin, as well as a small beverage service area and refrigerator. The room is amply and comfortably furnished. The mobile unit is equipped in the rear with an access staircase, which will be hinged in the middle, for folding and stowage inside the semi-trailer.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 3:
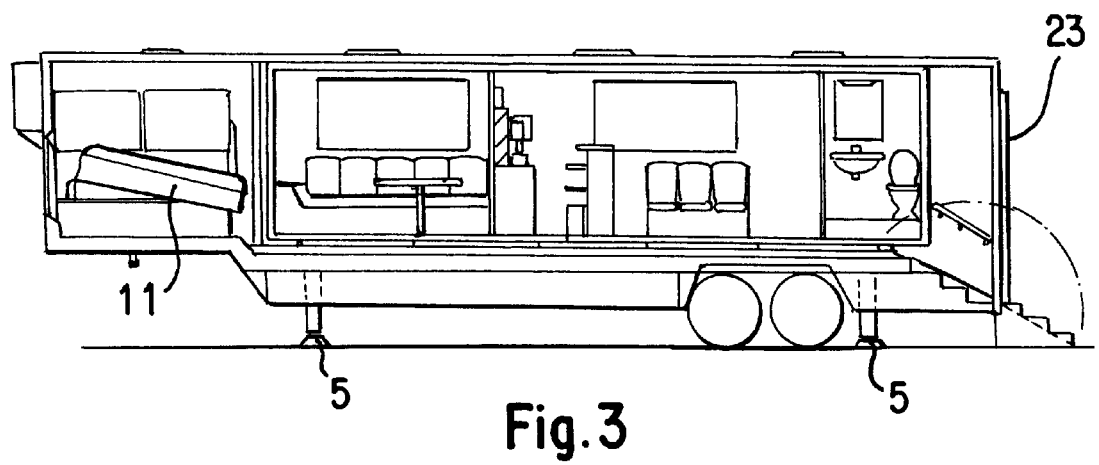
FIG. 3 is a side view of the mobile mortuary shown in FIG. 1.
Figure 4:
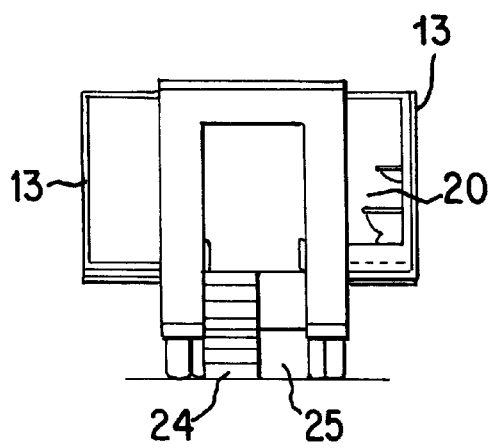
FIG. 4 is a front view of the mobile mortuary shown in FIG. 1.

The mobile mortuary 1 is comprised of a semi-trailer 2 having two axles 3 which includes a prismatic body structure 4 and two retractable stanchions 5 (FIG. 3) which impart stability to the mobile unit. The mobile unit has a cooled room 6 for the deceased, a room for the immediate family 7 and a common room 8.

Figure 1:
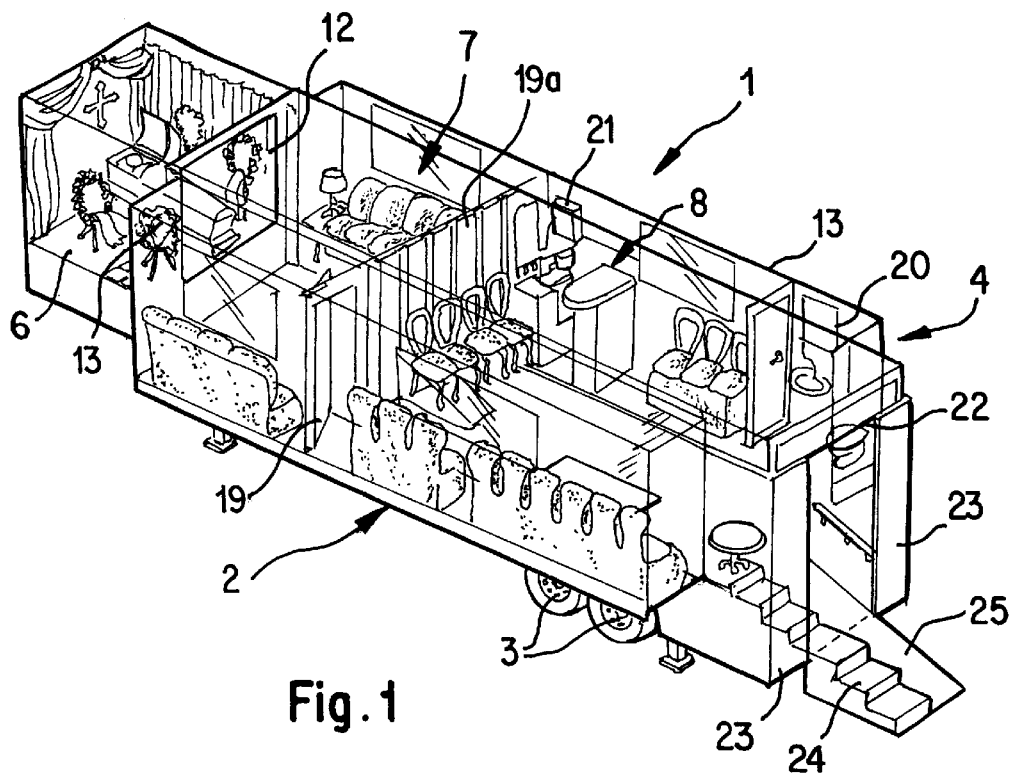
FIG. 1 is a perspective view of the mobile mortuary according to the present invention.
Figure 2:
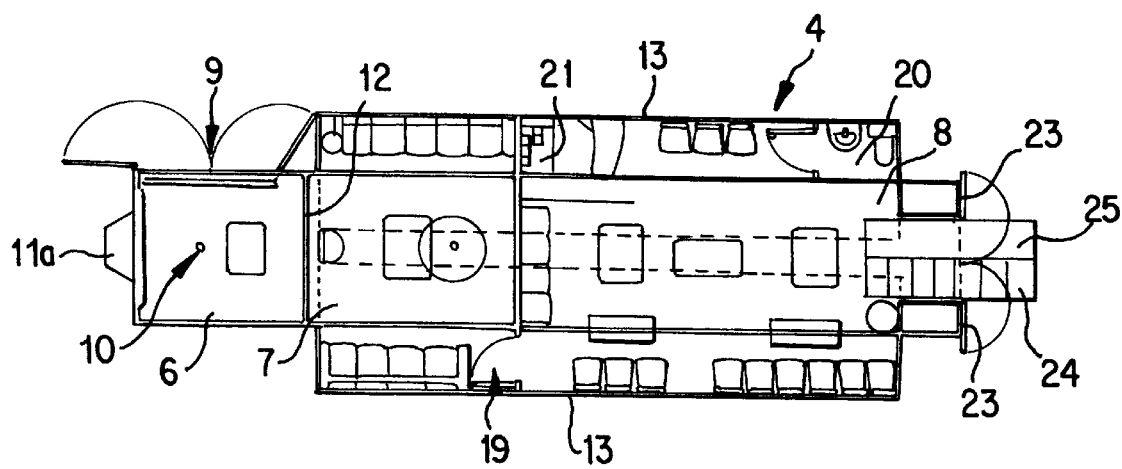
FIG. 2 is a plan view of the mobile mortuary shown in FIG. 1.

The cooled room 6 has an access door 9 (FIG. 2) and a central zone 10 which accommodates a casket 11. This room 6 is cooled by the appropriate and necessary conventional cooling apparatus 11a. The room 6 also has a glassed-in window 12 covered with an inside venetian blind. The interior decor is based upon curtains, and also includes devices to hang wreaths.

Figure 5:
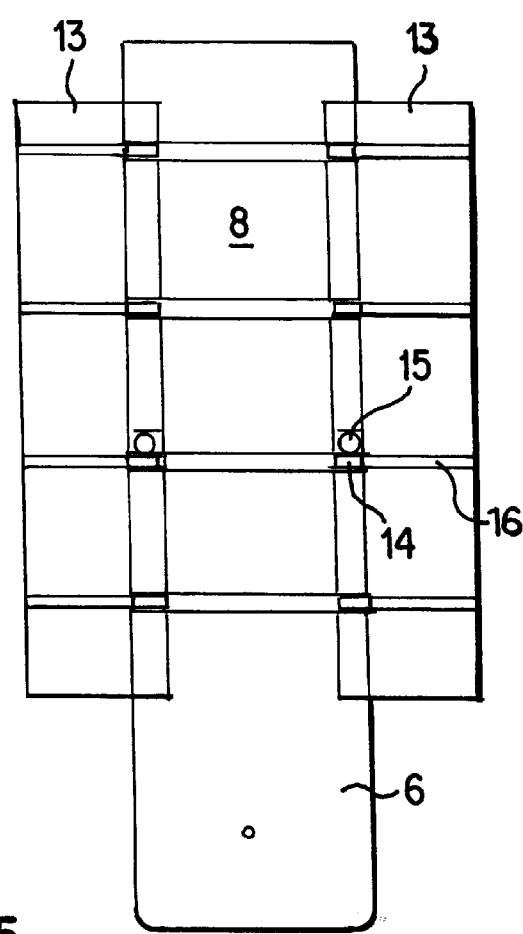
FIG. 5 is a plan view of the structural arrangement and guides which permit the side extensions.
Figure 6:
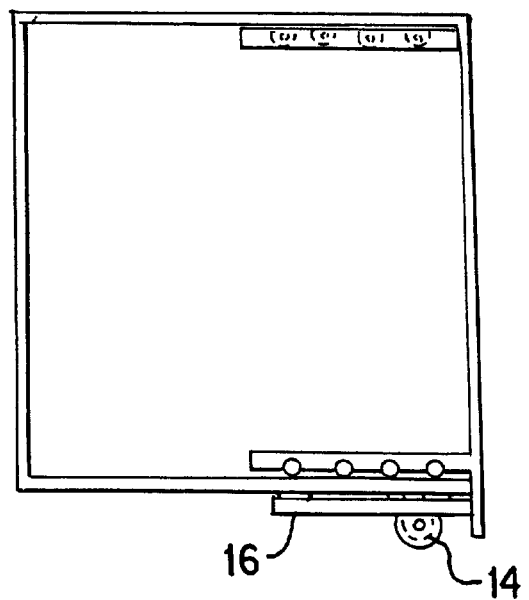
FIG. 6 is a side view of the two body sides in the closed position.
Figure 7:
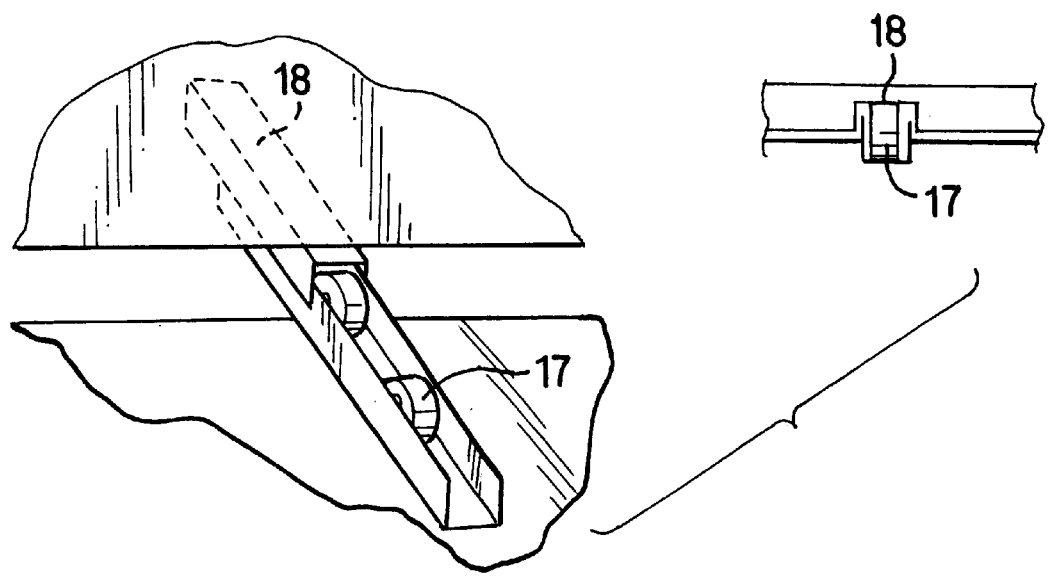
FIG. 7 shows a detail of the upper guides which permit displacement of the sides.
Figure 8:
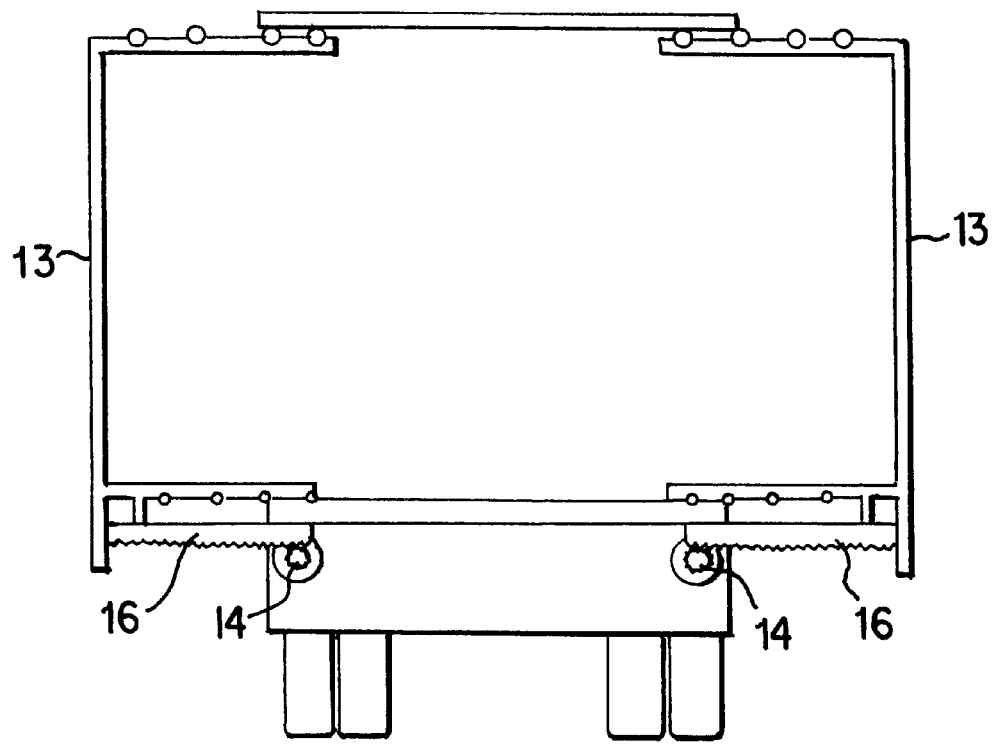
FIG. 8 is a side view of the two body sides in the open position.
Figure 9:
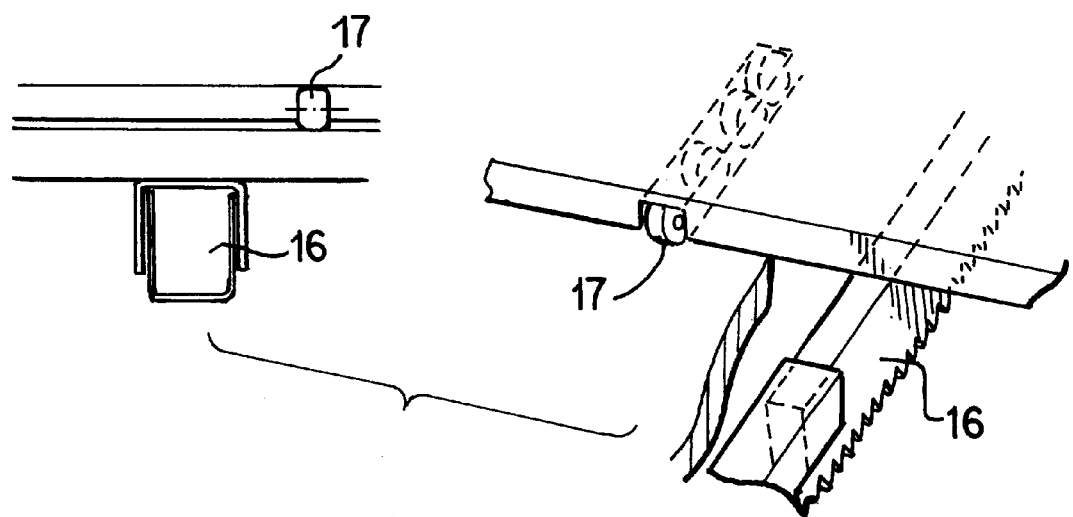
FIG. 9 shows a detail of the lower guides and of the rack and pinion transmission which drives the opening and closing of the body sides.

The room complex 7, 8 has expandable side walls 13. Such expansion is accomplished by a rack and pinion mechanism shown in FIGS. 5 and 6. The pinion 14 is driven by a motor 15 and displaces the rack 16 which is affixed to the moving portion of the corresponding side wall as seen in FIGS. 5 and 6. The displacement of the two side walls 13 is guided in the two directions by means of guide rollers 17 of the mobile part which slides over the guides 18 of the stationary part as seen in FIG. 7. The equipment and furnishings of the room complex 7, 8 are subject to variation. These rooms are connectable by a door 19 and an accordion-type screen 19a. In one of its extractable parts, room 8 has a rest room with wash basin 20 and a small beverage service area 21. The rear portion 22 of the unit has a double door 23 which permits the unfolding and positioning on the ground of a staircase 24 and ramp 25 appropriately hinged for this operation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A mobile mortuary comprising a semi-trailer enclosed by a chassis structure thereof which has expandable, opposed side walls, the semi-trailer having an interior which constitutes a mobile unit divided into at least three compartments, with one of the compartments being a cooled end cabin, independent of the at least other two compartments, and having a side access door for emplacement of a casket so as to be visible through an inside end window, and the at least other two compartments defining a zone in which a body of the semi-trailer has the expandable opposed side walls, one of the at least two outer compartments which is at the end, being accessible via a rear end of the mobile unit by a staircase and a ramp which are configured to be folded up into a recessed position.

2. The mobile mortuary in accordance with claim 1, wherein motors are installed in the semi-trailer chassis structure to drive a rack and pinion mechanism, the rack being mounted on the moving part of the side wall and the said side walls being displaceably guidable by upper and lower guides with rollers which move along facing guides in a stationary portion of the body.

3. The mobile mortuary, comprising a semi-trailer enclosed by a chassis structure thereof which has expandable, opposed side walls, the semi-trailer having an interior which constitutes a mobile unit divided into at least three compartments, with one of the compartments being a cooled end cabin, independent of the at least other two compartments, and having a side access door for emplacement of a casket so as to be visible through an inside end window, and the at least other two compartments defining a zone in which a body of the semi-trailer has the expandable opposed side walls, one of the at least two outer compartments which is at the end, being accessible via a rear end of the mobile unit by a staircase and a ramp which are configured to be folded up into a recessed position wherein the two end cabins belonging to the extendable body are arranged to be separated by a vertical surface having a central screen of folding fabric panels configured to unfold when two sides of the extendable body are extended.

4. The mobile mortuary in accordance with claim 3, wherein motors are installed in the semi-trailer chassis structure to drive a rack and pinion mechanism, the racking being mounted on the moving part of the side wall and the said side walls being displaceably guidable by upper and lower guides with rollers which move along facing guides in a stationary portion of the body.

* * * * *